United States Patent Office 2,779,785
Patented Jan. 29, 1957

2,779,785

HALOGENATED PHENYL-SALICYLIC ACIDS

Luther F. Berhenke, Midland, Mich., assignor to The Dow Chemical Company, Midland, Mich., a corporation of Delaware No Drawing. Application December 22, 1952,
Serial No. 327,455

6 Claims. (Cl. 260—520)

The present invention is concerned with certain halogenated phenyl-salicylic acids of the following formula

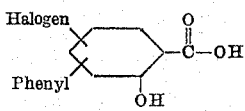

wherein the halogen substituent occupies one of the positions meta- to the carboxyl group, the position of said halogen substituent being also para- to the hydroxyl group when the phenyl substituent is meta- thereto. These new compounds are crystalline solids somewhat soluble in many organic solvents and relatively insoluble in water. The compounds exert a strong parasiticidal action against such organisms as bacteria, fungi and insects and are adapted to be employed as preservatives for paper, paint, wood and textile products. The compounds are also adapted to be employed as toxic constituents of germicidal compositions for the destruction of bacterial and fungal organisms and as toxic constituents of spray and dust compositions for the control of common household and agricultural pests such as mites, aphids, beetles and worms. The use of the novel compounds as intermediates for the preparation of certain more complex salicylic acid derivatives is disclosed in U. S. Patent No. 2,584,160.

The new compounds may be prepared by halogenating a mono-phenyl-salicylic acid of the formula

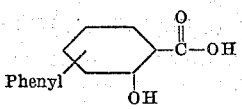

whereby halogen is substituted in a position meta- to the carboxyl radical. This halogenation is generally carried out in glacial acetic acid as reaction solvent and at a temperature of from about 40° to 115° C. The amount of the mono-phenyl salicylic acid and halogenating reagent to be employed is not critical, some of the desired product being produced with any proportion of ingredients. In general, optimum yields are obtained when employing about stoichiometric proportions of the mono-phenyl-salicylic acid and the halogenating agent. The employment of an excess of the halogenating agent does not have an adverse affect upon the reaction, but is undesirable from the standpoint of economy.

Where it is desired to prepare the mono-iodo-monophenyl-salicylic acid compounds, the mono-phenyl-salicylic acid starting material is treated with a hologenating agent such as iodine chloride. In the latter operation, the mono-phenyl-salicylic acid may be dissolved in glacial acetic acid and the halogenating agent added portionwise thereto with stirring. The addition is generally carried out at a temperature of from about 40° to 115° C., and the resulting mixture thereafter maintained at this same temperature range for a period of time to complete the reaction. The crude reaction mixture may then be diluted with water, the desired product precipitating as a crystalline solid. The latter aqueous slurry of crystals may be treated with a small amount of a reducing agent such as sodium bisulfite to reduce any excess iodine in the mixture, and the mixture thereafter filtered to separate the desired product. The latter may be further purified by recrystallization from suitable organic solvents. In another method, the purification may be carried out by recrystallizing a suitable metal salt of the salicylic acid compound from water and thereafter acidifying an aqueous dispersion of the recrystallized salt to obtain the purified product.

Where it is desired to introduce chlorine or bromine into the molecule, the mono-phenyl-salicylic acid starting material may be dissolved in glacial acetic acid and bromine or gaseous chlorine slowly added portionwise to the above mixture at a temperature of from about 40° to 115° C. Upon completion of the reaction, the mixture may be diluted with an excess of water, the desired product precipitating as a crystalline solid. The latter may be separated by filtration and further purified by recrystallization from suitable organic solvents.

The following examples illustrate the invention but are not to be construed as limiting:

Example 1

642 grams (3 moles) of 3-phenyl-salicylic acid was dissolved in 3500 grams of glacial acetic acid and the resulting mixture placed in a flask equipped with a stirrer, reflux condenser and chlorine inlet. 230 grams (3.2 moles) of chloride gas was then introduced into the above mixture over a period of about 3 hours. The latter operation was carried out with stirring and at a temperature of from about 50° to 64° C. Following the addition, the reaction mixture was diluted with 2000 milliliters of water, a 5-chloro-3-phenyl-salicylic acid product precipitating as a crystalline solid. The latter was separated by filtration and found to melt at 182–184° C.

Example 2

325 grams (2 moles) of iodine chloride was dissolved in 100 milliliters of glacial acetic acid and the resulting solution added portionwise with stirring to 428 grams (2 moles) of 4-phenyl-salicylic acid dissolved in 1070 milliliters of glacial acetic acid. The addition was carried out with stirring and at a temperature of from about 34° to 42° C. Following the addition, the mixture was warmed to a temperature of 95° C. and maintained at this same temperature for about 6 hours to complete the reaction. The crude mixture was then diluted with 2500 milliliters of water, a crude material precipitating in the mixture as fine white crystals. This aqueous slurry of crystals was treated with 32.5 grams of sodium bisulfite to reduce any excess iodine, and the resulting mixture filtered to obtain a 5-iodo-4-phenyl-salicylic acid product as a white crystalline residue. The latter product was neutralized with sodium hydroxide in water as reaction medium to prepare sodium 5-iodo-4-phenyl-salicylate, which was thereafter recrystallized from water. An aqueous dispersion of the recrystallized salt was then treated with hydrochloric acid to precipitate a 5-iodo-4-phenyl-salicylic acid product which was separated, dried and found to melt at 194°–196° C.

Example 3

214 grams (1.0 mole) of 3-phenyl-salicylic acid was dissolved in 1200 grams of glacial acetic acid and 163 grams (1.0 mole) of bromine added dropwise thereto over a period of about 35 minutes. The addition was carried out with stirring and at a temperature of from 53° to 61° C. Following the addition, the mixture was maintained at a temperature of from about 55° to 60° C. for 4.5 hours to complete the reaction. The reaction mixture was then treated with about 10 grams of sodium bisulfite and the resulting product diluted with water and cooled to about 5° C. During the cooling a 5-bromo-3-phenyl-salicylic acid product precipitated from solution as fine crystals. The latter was separated, recrystallized from benzene and found to melt at 174°–176° C.

*Example 4*

975 grams (6 moles of iodine chloride was added portionwise with stirring to 1284 grams (6 moles) of 3-phenyl-salicylic acid dissolved in 3010 milliliters of glacial acetic acid. The addition was carried out over a period of about 1.5 hours and at a temperature of from 56° to 60° C. 200 milliliters of additional glacial acetic acid was then added to the reaction zone and the resulting mixture maintained at a temperature of from 50° to 60° C. for about 3 hours to complete the reaction. The reaction vessel and contents were then cooled to room temperature, a crude material precipitating as a crystalline solid. The latter was separated by filtration, slurried in water and the slurry treated with a small quantity of sodium bisulfite and thereafter filtered to obtain a 5-iodo-3-phenyl-salicylic acid product as a crystalline residue. This product was neutralized with sodium hydroxide in water as reaction medium to give a solution of sodium 5-iodo-3-phenyl-salicylate. This solution was then treated with an amount of magnesium chloride stoichiometrically equivalent to the dissolved salicylate to prepare magnesium 5-iodo-3-phenyl-salicylate and the magnesium salt thereafter recrystallized from water. An aqueous slurry of the recrystallized magnesium salt was then treated with hydrochloric acid to precipitate a 5-iodo-3-phenyl-salicylic acid product, which was separated by filtration and dried. The dried product was recrystallized from benzene and found to melt at 185°–188° C.

*Example 5*

79.9 grams (0.5 mole) of bromine was added dropwise with stirring to 107 grams (0.5 mole) of 5-phenyl-salicylic acid dissolved in 1605 milliliters of glacial acetic acid. The addition was carried out over a period of about 4 hours and at a temperature of 75° C. Stirring was thereafter continued and the mixture maintained at a temperature of from 75° to 80° C. for about 5 hours to complete the reaction. The reaction vessel and contents were then cooled to room temperature, a crude material precipitating as a crystalline solid. The latter was separated, successively washed with glacial acetic acid and water, and dried. As a result of the above operations a 3-bromo-5-phenyl-salicylic acid product was obtained as a crystalline solid. When the latter was recrystallized from chlorobenzene, it was found to melt at 213°–213.2° C.

*Example 6*

214 grams (1 mole) of 6-phenyl-salicylic acid is dissolved in 1500 milliliters of glacial acetic acid and the resulting mixture placed in a flask equipped with a stirrer, reflux condenser and chlorine inlet. 71 grams (1 mole) of chlorine gas is then introduced into the above mixture over a period of 4 hours. The latter operation is carried out with stirring and at a temperature of from 60° to 70° C. Following the addition the reaction mixture is diluted with water, and filtered to obtain a 5-chloro-6-phenyl-salicylic acid product as a crystalline residue.

The new halogenated phenyl-salicylic acid products are effective as parasiticides for the control of mites, insects, bacteria and fungi. In an operation illustrative of the effectiveness of the new compounds, a 100 percent control of the growth of *Rhizopus nigricans* was obtained in a malt-agar, growth medium containing 2.48 parts by weight of 5-chloro-3-phenyl-salicylic acid per 100,000 parts by volume of the growth medium.

I claim:

1. A halogenated phenyl-salicylic acid of the following formula

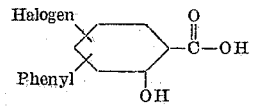

wherein the halogen substituent occupies one of the positions meta- to the carboxyl group, the position of said halogen substituent being also para- to the hydroxyl group when phenyl substituent is meta- thereto.

2. 5-chloro-3-phenyl-salicylic acid.
3. 5-iodo-4-phenyl-salicylic acid.
4. 5-bromo-3-phenyl-salicylic acid.
5. 5-iodo-3-phenyl-salicylic acid.
6. 3-bromo-5-phenyl-salicylic acid.

References Cited in the file of this patent

UNITED STATES PATENTS

| 1,941,207 | Harvey | Dec. 26, 1933 |
| 2,584,160 | Sahyun | Feb. 5, 1952 |

OTHER REFERENCES

Brown: "Insect Control by Chemicals" (pp. 95 and 99), 1951, Wiley.